United States Patent
Stamm et al.

(10) Patent No.: US 9,204,505 B2
(45) Date of Patent: Dec. 1, 2015

(54) POWER CONVERTER FOR INTERFACING A FLUORESCENT LIGHTING BALLAST TO A LIGHT EMITTING DIODE LAMP

(71) Applicant: STMicroelectronics, Inc., Coppell, TX (US)

(72) Inventors: Thomas Stamm, Chicago, IL (US); Jianwen Shao, Hoffman Estates, IL (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 14/226,316

(22) Filed: Mar. 26, 2014

(65) Prior Publication Data

US 2014/0320007 A1 Oct. 30, 2014

Related U.S. Application Data (60) Provisional application No. 61/817,065, filed on Apr. 29, 2013.

(51) Int. Cl.
*H05B 37/02* (2006.01)
*H05B 33/08* (2006.01)

(52) U.S. Cl.
CPC ........ *H05B 33/0815* (2013.01); *H05B 33/0887* (2013.01); *Y02B 20/341* (2013.01); *Y02B 20/347* (2013.01)

(58) Field of Classification Search
CPC ........... H05B 33/0845; H05B 33/0815; H05B 41/3921; H05B 37/02

USPC ............... 315/122, 224, 51, 307, 291, 200 R, 315/185 R; 363/21

See application file for complete search history.

(56) References Cited

U.S. PATENT DOCUMENTS

| | | | |
|---|---|---|---|
| 2008/0266849 A1 | 10/2008 | Nielson et al. | |
| 2010/0060187 A1* | 3/2010 | Newman et al. | 315/291 |
| 2010/0066260 A1* | 3/2010 | Newman et al. | 315/246 |
| 2011/0109249 A1* | 5/2011 | Liu et al. | 315/307 |
| 2012/0081009 A1* | 4/2012 | Shteynberg et al. | 315/122 |
| 2012/0229044 A1* | 9/2012 | Nerone | 315/210 |
| 2012/0250367 A1* | 10/2012 | Desimone et al. | 363/21.17 |
| 2013/0163243 A1* | 6/2013 | Reed | 362/235 |

(Continued)

OTHER PUBLICATIONS

Chen, Nan et al: "A Driving Technology for Retrofit LED Lamp for Fluorescent Lighting Fixtures With Electronic Ballasts," IEEE Transactions on Power Electronics, vol. 26, No. 2, Feb. 2011, pp. 588-601.

*Primary Examiner* — Douglas W Owens
*Assistant Examiner* — Syed M Kaiser
(74) *Attorney, Agent, or Firm* — Gardere Wynne Sewell LLP (57) ABSTRACT

An AC/DC power converter is coupled between a fluorescent ballast circuit and a set of light emitting diodes (LEDs) forming an LED lamp. The power converter converts an AC output from the ballast circuit to a DC current applied to drive operation of the LEDs. The power converter transforms and rectifies the AC output from the ballast circuit to generate a DC output current. An open load protection circuit is coupled to protect the ballast circuit when the LED lamp is not connected. Current control is provided by a transistor having a source/drain conduction path coupled to shunt the DC output current in response to a control signal having a duty cycle generated as a function of a zero-crossing of the AC output and a sensed value of the DC output current applied to the LED lamp.

25 Claims, 4 Drawing Sheets

(56) References Cited

U.S. PATENT DOCUMENTS

| | | | |
|---|---|---|---|
| 2013/0301309 A1* | 11/2013 | Chen | 363/21.12 |
| 2014/0028211 A1* | 1/2014 | Imam et al. | 315/200 R |
| 2014/0111113 A1* | 4/2014 | Del Carmen, Jr. | 315/297 |
| 2014/0125303 A1* | 5/2014 | Dagan et al. | 323/282 |
| 2014/0132164 A1* | 5/2014 | McBryde et al. | 315/187 |
| 2014/0265899 A1* | 9/2014 | Sadwick | 315/200 R |

* cited by examiner

POWER CONVERTER FOR INTERFACING A FLUORESCENT LIGHTING BALLAST TO A LIGHT EMITTING DIODE LAMP

PRIORITY CLAIM

This application claims priority from U.S. Provisional Patent Application No. 61/817,065 filed Apr. 29, 2013, the disclosure of which is incorporated by reference.

TECHNICAL FIELD

This application is directed to a power conversion circuit suitable for use in converting AC power output from a fluorescent light ballast circuit to DC power suitable for use in driving a light emitting diode (LED) lamp. Such a power conversion circuit can be used in connection with the production of an LED lamp for installation into a fluorescent light fixture.

BACKGROUND

A widely and commonly used light fixture in both commercial and residential buildings is the fluorescent light. It has proven to be a satisfactory alternative to incandescent light at least because it consumes less energy and emits less heat. There are still concerns, however, with the amount of energy that a fluorescent light consumes and with the mercury content within the fluorescent tube. With the improvement in light emitting diode (LED) technology, for example in the increase in lumen output at lower power consumption and the ability to be dimmed, the LED lamp is now seen as an attractive alternative to both the incandescent light and fluorescent light. Although ecologic concerns may still exist with LED lamps, these concerns are of less import given the extended lifespan of LED lamps.

A significant challenge to the adoption of LED lighting for use in commercial and residential buildings is the cost to remove and replace a fluorescent lighting fixture with an LED lighting fixture.

United States Patent Application Publication No. 2008/0266849, the disclosure of which is hereby incorporated by reference, suggests that a fluorescent lighting fixture can be retrofitted with one or more LED lamps. The advantage of such a retrofit solution is that the existing fluorescent fixture structure can be retained, thus obviating the need to remove the structure, install a new structure and repair, if needed, any damage to a wall or ceiling caused by the fixture removal and replacement.

Because LED lights operate off of direct current (DC) while fluorescent lights operate from alternating current (AC), the retrofit involves not only changing the lamp itself (from fluorescent to LED) but also changing the electronics which drive the lamp. In one option, this would mean removing the fluorescent ballast circuit from the fixture and installing an LED driver circuit coupled to the AC building mains. Removal of the ballast circuit, however, can be challenging and further involves a significant labor cost. Thus, in another option the fluorescent ballast is retained and an AC/DC power converter circuit is installed at the output of the fluorescent ballast as an interface to the retrofit installed LED lamp.

The reference Nan, et al., "A Driving Technology for Retrofit LED Lamp for Fluorescent Lighting Fixtures With Electronic Ballasts", IEEE Transactions on Power Electronics, vol. 26, no. 2, February 2011, page 588, the disclosure of which is hereby incorporated by reference, teaches one form of an AC/DC power converter and LED lamp driver circuit for use in a retrofit configuration. A disadvantage of the circuit proposed by Nan is a relatively high cost.

A need exists in the art for a low cost AC/DC power converter and LED lamp driver circuit suited for use in interfacing a fluorescent ballast to power an LED lamp.

SUMMARY

In an embodiment, an apparatus comprises: a rectifier circuit having input terminals coupled to receive an AC signal and output terminals configured to generate a DC signal; a diode coupled between one output terminal of the rectifier circuit and a first converter output terminal; a capacitor coupled between the first converter output terminal and a second converter output terminal; a switched shunt circuit coupled between output terminals of the rectifier circuit; and a control circuit configured to control actuation of the switched shunt circuit using a PWM control signal having a duty cycle set dependent on a zero-crossing of the AC signal and current flowing at the first and second converter output terminals.

In an embodiment, an apparatus comprises: a housing; a plurality of LEDs located within the housing; and an AC/DC power converter located within the housing and configured to supply current to the plurality of LEDs. The AC/DC power converter comprises: a rectifier circuit having input terminals coupled to receive an AC signal and output terminals configured to generate a DC signal; a diode coupled between one output terminal of the rectifier circuit and a first converter output terminal coupled to the plurality of LEDs; a capacitor coupled between the first converter output terminal and a second converter output terminal; a switched shunt circuit coupled between output terminals of the rectifier circuit; and a control circuit configured to control actuation of the switched shunt circuit using a PWM control signal having a duty cycle set dependent on a zero-crossing of the AC signal and current flowing at the first and second converter output terminals through the plurality of LEDs.

BRIEF DESCRIPTION OF THE DRAWINGS

A more complete understanding of embodiments described herein may be obtained by reference to the following figures wherein.

DETAILED DESCRIPTION OF THE DRAWINGS

Figure 1:
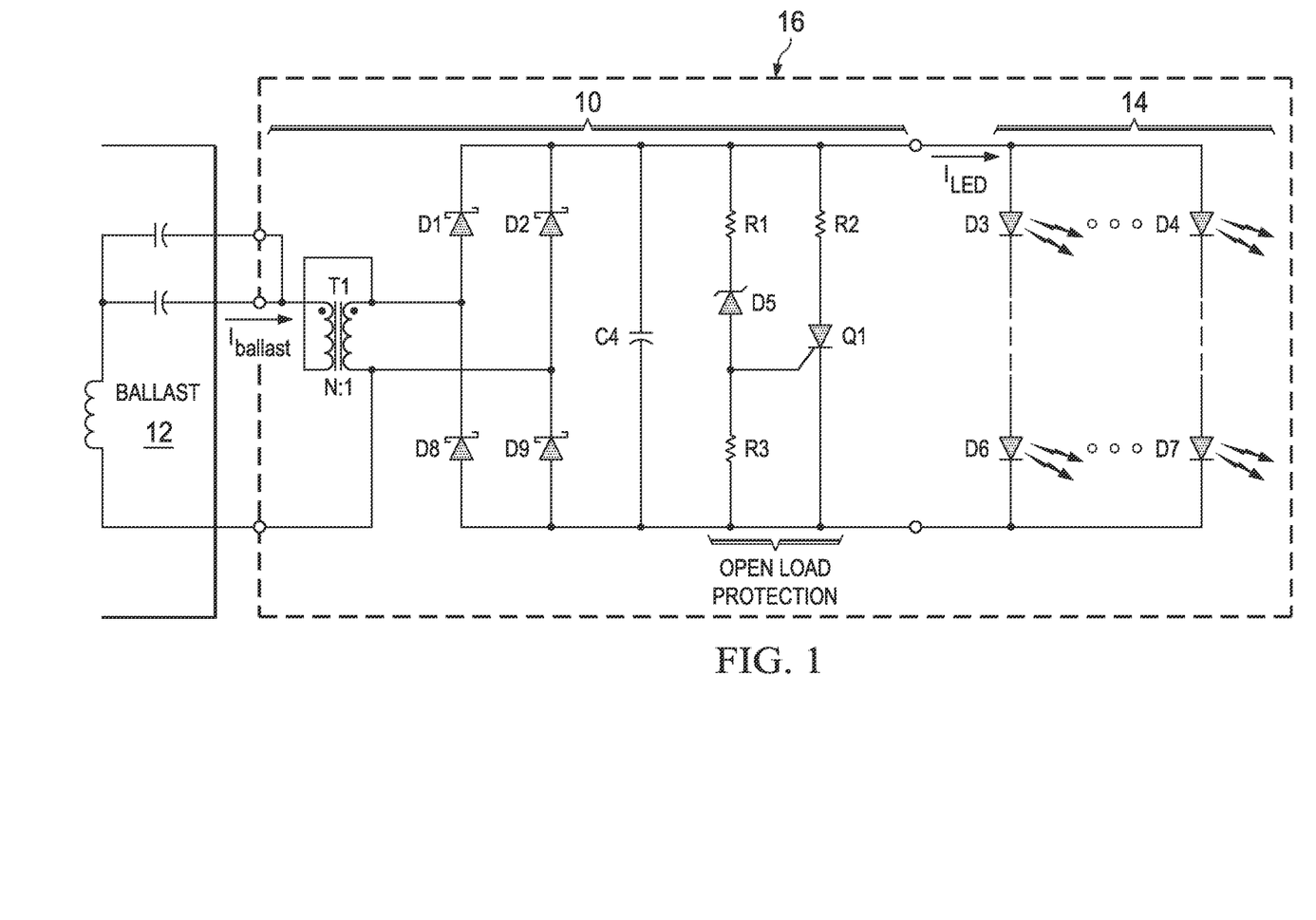
FIG. 1 is a block diagram of a first embodiment of an AC/DC power converter and LED lamp driver circuit.

Reference is now made to FIG. 1 which illustrates a block diagram of a first embodiment of an AC/DC power converter and LED lamp driver circuit 10 configured to interface a fluorescent ballast circuit 12 to an LED lamp 14. The ballast circuit 12 is of conventional configuration well known to those skilled in the art, and may comprise either an electromagnetic or electronic ballast. The LED lamp 14 is formed of an array of LED lights (represented by diodes D3, D4, D6 and D7) connected in series/parallel in a manner known to those skilled in the art.

The circuit 10 includes a pair of input terminals coupled to corresponding output terminals of the ballast circuit 12 to receive an alternating current (AC) output from the ballast circuit. The circuit 10 further includes a pair of output terminals coupled to corresponding input terminals of the LED lamp 14 to deliver a direct current (DC) to drive the LED lamp.

The circuitry of the circuit 10 includes a transformer T1 having first terminals connected to the circuit 10 input terminals. The transformer T1 further includes second terminals connected to the input terminals of a rectifier circuit (for example, a diode bridge rectifier circuit formed by diodes D1, D2, D8 and D9). A filter capacitor C4 is coupled across the output terminals of the rectifier circuit. The output terminals of the rectifier circuit are further coupled to the circuit 10 output terminals.

It will be understood that for some loads coupled to the output terminals that the transformer T1 may not be needed.

If the turns ratio of the transformer T1 is N:1, then the current $I_{LED}$ supplied to the LED lamp 14 at the output terminals of the circuit 10 may be calculated as follows:

$$I_{LED} = N * \frac{2*\sqrt{2}}{\pi} * I_{ballast}$$

Wherein $I_{ballast}$ is the output current of the ballast circuit 12 supplied to the input terminals of the circuit 10.

One particular issue for the ballast circuit 12 is open load protection. If there exists an open load, the output voltage at the output terminals of the ballast circuit 12 can be extremely high and present a dangerous condition. To address this issue, the circuit 10 further includes an open load protection circuit. The open load protection circuit is formed by an SCR Q1 whose conduction path is coupled in series with a limiting resistor R2 between the output terminals of the circuit 10. The open load protection circuit further includes a triggering circuit formed by the series connection of resistor R1, zener diode D5 and resistor R3 which is coupled between the output terminals of the circuit 10 in parallel with the SCR Q1 and resistor R2. The anode terminal of the zener diode D5 is connected to the control terminal of the SCR Q1. The zener diode D5 sets a voltage sensing threshold. When an open load condition exists and the voltage at the output terminals of the circuit 10 rises, the voltage across the SCR Q1 correspondingly rises. When that voltage exceeds the voltage sensing threshold set by zener diode D5, the SCR Q1 is triggered and the output terminals of the circuit 10 are shorted.

The circuit 10 and LED lamp 14 may be contained within a housing 16 to form a retrofit bulb assembly suitable to be installed in a conventional fluorescent lighting fixture and driven in operation from the ballast circuit 12. As an example, the housing 16 may take the form and shape of a tubular fluorescent light bulb known in the art and include suitable plug pins like those typically used in connection with fluorescent lighting fixtures.

Alternatively, the circuit 10 may comprise a separate circuit assembly that can be installed within a conventional fluorescent lighting fixture and connected to the existing ballast circuit 12.

Still further, the housing 16 may comprise a lighting fixture which may include the ballast circuit 12 or other circuitry providing AC power.

A drawback of the circuit 10 shown in FIG. 1 is that there is no control exercised over the current $I_{LED}$ supplied to the LED lamp 14. This drawback is addressed by the circuit 10' shown in FIG. 2 which illustrates a block diagram of a second embodiment of an AC/DC power converter and LED lamp driver circuit configured to interface a fluorescent ballast 12 to an LED lamp 14.

Figure 2:
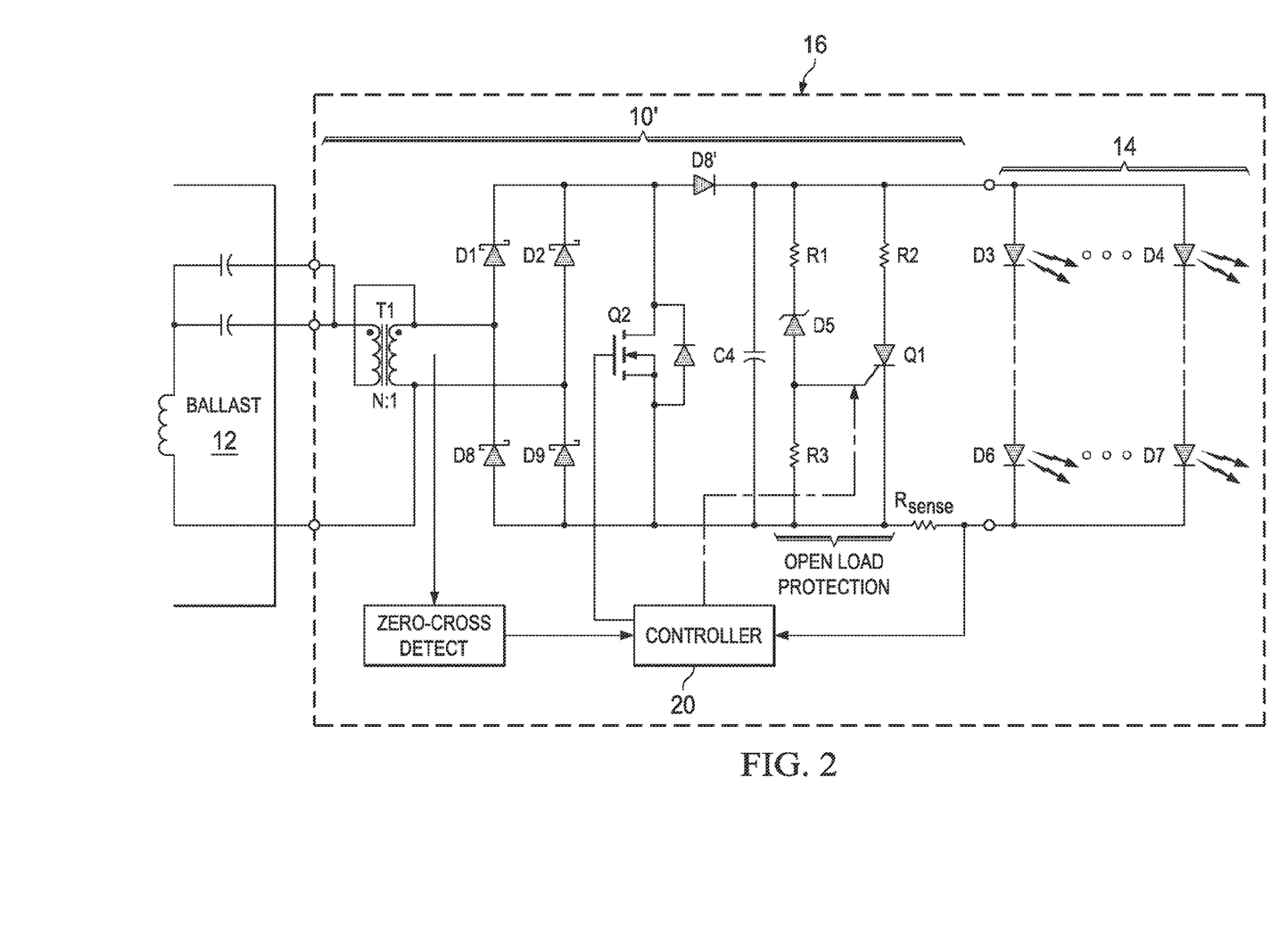
FIG. 2 is a block diagram of a second embodiment of an AC/DC power converter and LED lamp driver circuit.

Like reference numbers in FIGS. 1 and 2 refer to like components and no further description of same will be provided.

The circuit 10' differs from the circuit 10 of FIG. 2 in the provision of an active LED current control capability.

A diode D8' is coupled between one output terminal of the rectifier circuit and one output terminal of the circuit 10' (coupled to the LEDs 14). The diode D8' is oriented with its cathode connected towards the one output terminal of the circuit 10' and functions to permit DC current flow in only one direction toward the LED lamp 14.

A resistor $R_{sense}$ is coupled between another output terminal of the rectifier circuit and another output terminal of the circuit 10'. The resistor $R_{sense}$ functions to sense current flowing through the LED lamp 14.

A control circuit (Controller) 20 is coupled to the resistor $R_{sense}$ to measure the sensed current flowing through the LED lamp 14. The control circuit 20 may comprise either an analog controller or a digital controller (such as a microcontroller). A specific, but not limiting implementation of an analog control circuit will be described in connection with FIGS. 3A and 3B.

A MOSFET transistor Q2 has its source-drain conduction path coupled between the one output terminal of the rectifier circuit (at the anode terminal of diode D8') and the other output terminal of the rectifier circuit. The gate (control) terminal of the transistor Q2 is coupled to receive a control signal output from the control circuit 20. The transistor Q2 functions as a controllable shunting circuit.

The control circuit 20 functionality provides a control signal to the gate of transistor Q2 that synchronizes with the output of the ballast circuit 12 (for example, by performing a zero-crossing detection and controlling actuation of the transistor Q2 in response to that detection and the sensed current flowing through the load). A zero-crossing detection circuit senses the output of the ballast circuit and generates a zero-crossing signal for input to the control circuit 20. It will be understood that the zero-crossing detection circuit may be implemented as a part of the control circuit 20. Responsive to the zero-crossing event, the control circuit 120 asserts the control signal and transistor Q2 is turned on for a period of time during which the output current from the rectifier circuit is shunted. Capacitor C4 filters the remaining current, which is delivered to the load as the current $I_{LED}$. This load current is sensed across the resistor Rsense and compared by the control circuit 120 to a threshold. When the threshold is exceeded, the control circuit 120 decreases the percentage of time that the transistor Q2 is turned off. The duration of the on-time for the transistor Q2 (i.e., the duty cycle D) determines the average current shunted around the load over time. The control circuit 20 sets the duty cycle D as a function of the sensed current $I_{LED}$ in comparison to the threshold.

For a duty cycle D, the current $I_{LED}$ may be expressed as follows:

$$I_{LED} \cong (1-D) * N * \frac{2*\sqrt{2}}{\pi} * I_{ballast} \text{rms}$$

It will accordingly be recognized that the circuit 10/10' treats the output of the ballast circuit 12 as a current source (as opposed to a voltage source as is conventional in power supply applications) and the LED lamp 14 needs to be current driven, so there is a corresponding matching of operation. Conversion of the AC current to DC current is effectuated by the rectifier circuit and matching of the current is accomplished to drive the LED lamp. With the ballast circuit operating in a current source configuration, the provision of an open load protection circuit is important from a safety perspective because in the presence of an open load the output voltage can be very high. The open load protection circuit functions to short the output of the circuit 10' when the output voltage exceeds a protection threshold.

While an analog circuit for the open load protection circuit is illustrated in FIGS. 1 and 2, it will be understood that a digital control circuit can instead be used to drive the trigger of SCR Q1. Indeed, in an alternative embodiment (illustrated by a dotted line in FIG. 2), the control circuit 20 may include an additional output coupled to drive the trigger of SCR Q1 (for example, in response to sensing circuitry coupled to sense current/voltage at the circuit 10' output terminals).

Figure 3A:
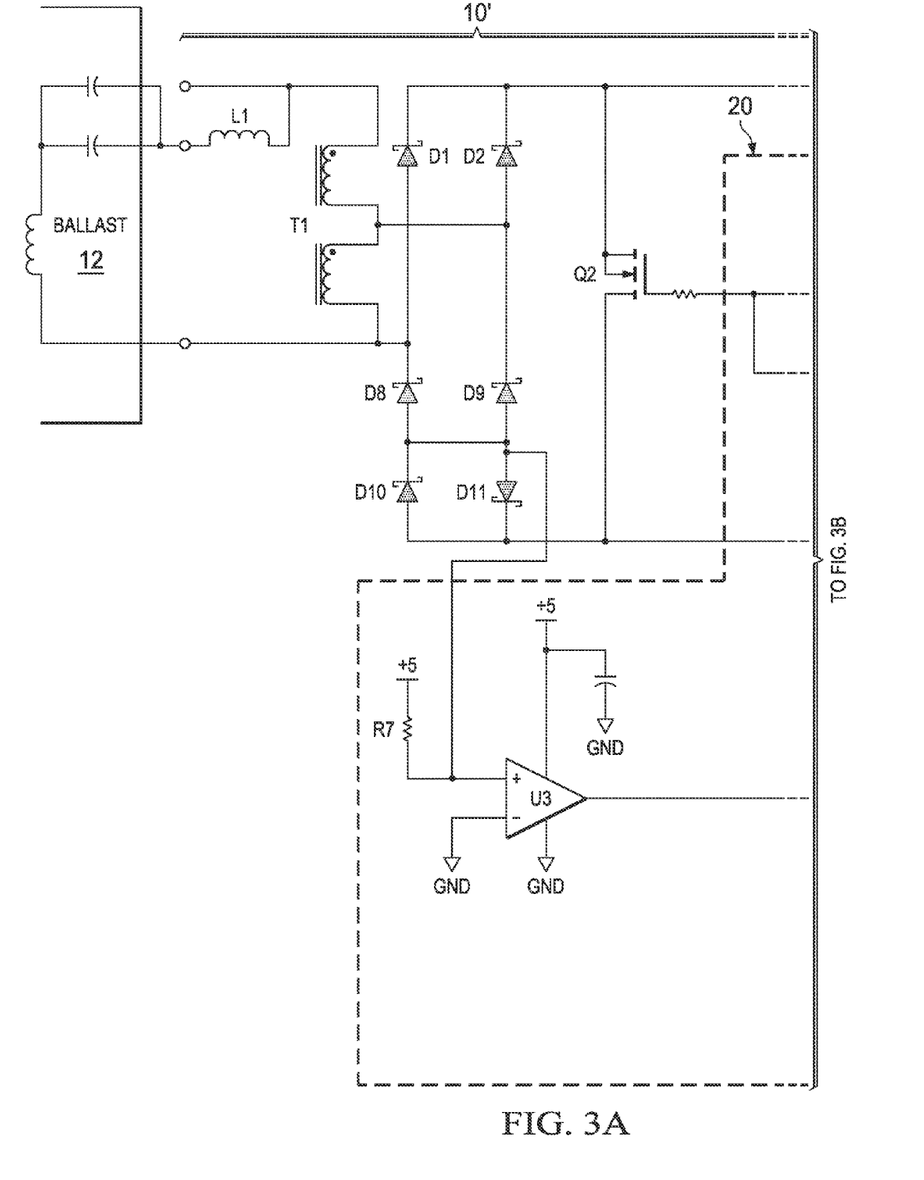
FIGS. 3A and 3B are a circuit diagram of a particular implementation of the driver circuit of FIG. 2.
Figure 3B:
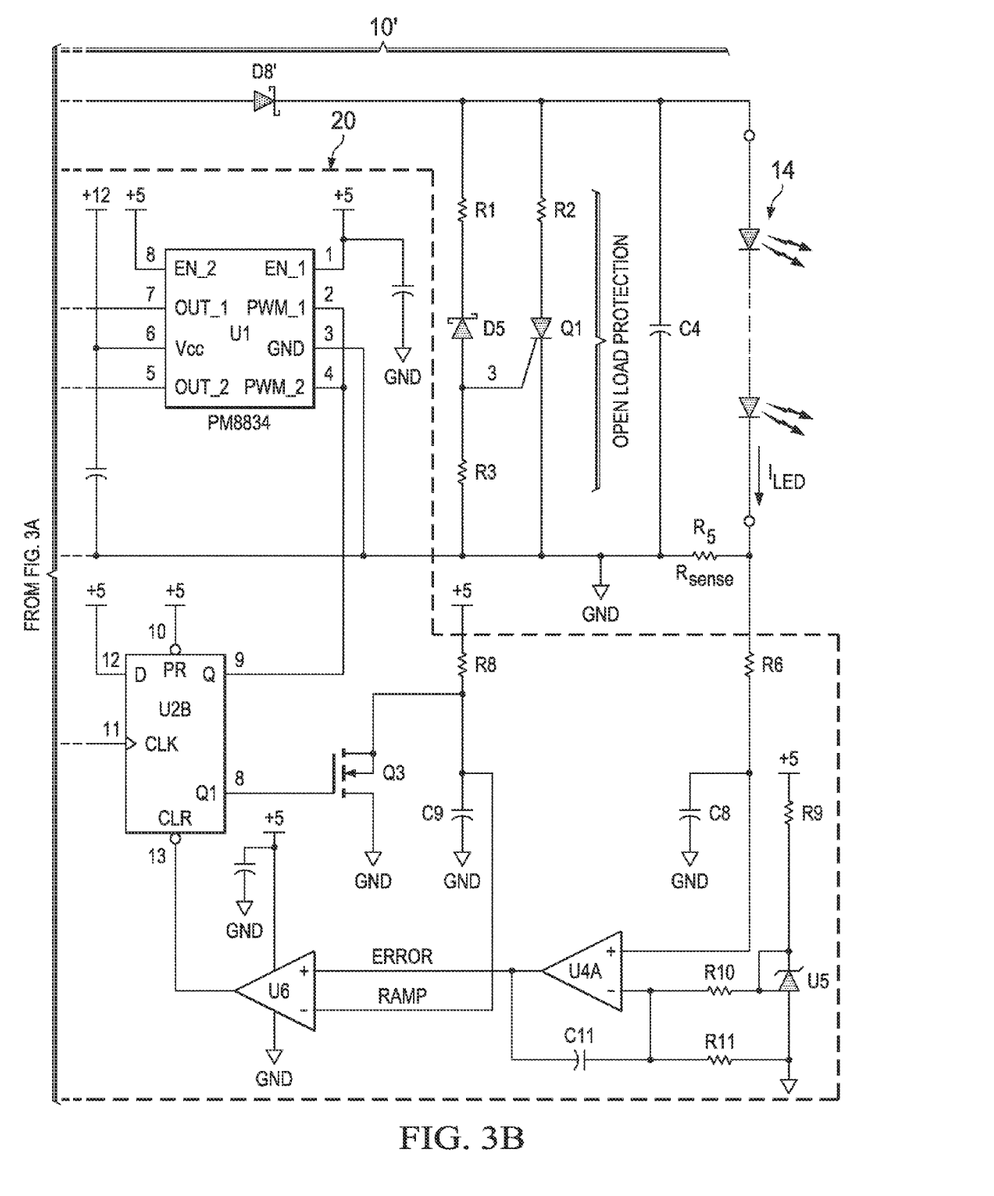

Reference is now made to FIGS. 3A and 3B wherein there is shown a circuit diagram of a particular implementation of the driver circuit 10' of FIG. 2. In particular, the circuit of FIG. 3 provides details on an exemplary implementation of the control circuit 20.

The ballast circuit 12 is considered as a high frequency current source. As long as the load current required by the LED lamp 14 is less than the supplied current from the ballast 12, a regulation of the current delivered to the load can be achieved by simply short-circuiting the ballast during a part of each AC half cycle (i.e., shunting around the load).

The transformer T1 functions in a step-down mode to ensure that the load current is less than the ballast current. The rectifier circuit rectifies the AC current to produce DC current and thus permits a simplification of the regulation circuit so that it can be designed for operation in only one polarity.

The regulation circuit, in general, operates by turning on Q2 to effectuate the short-circuiting (shunting) of the ballast circuit at the beginning of the half cycle (coincident with a detected zero-crossing), and then turning Q2 off at a later time determined by a regulation feedback circuit to be described which is based on sensed current passing through the load.

Diodes D10 and D11 are anti-parallel connected in a head to tail configuration to define an intermediate node for zero-crossing detection in connection with the operation of the rectifier circuit formed by diodes D1, D2, D8 and D9. The intermediate node provides an analog zero-crossing signal with the intermediate node connected to the positive input of a comparator U3. A pull-up resistor R7 is also connected to the positive input of the comparator U3. At a zero-crossing point, for example the point where the input AC current from the ballast circuit 12 transitions from positive to negative, there is no conduction in diode D10 and the voltage at the positive input of the comparator U3 rises (due to the effect of the pullup resistor R7) above the reference voltage (ground) applied at the negative input of the comparator U3. This causes the output logic state of the comparator U3 to flip and indicate detection of a zero-crossing with a generated digital zero-crossing signal. A corresponding operation occurs in the other half-cycle of the input AC current.

The output of the comparator U3 is coupled to the clock input of a D-type flip flop U2B. The data input (D) of flip flop U2B is tied to a positive reference voltage. When the logic output state of the comparator U3 flips, the change in state at the clock input causes the flip flop to load a logic high value through the D input and the true output Q of the flip flop also transitions to logic high. The logic high output signal comprises a gate control signal for the transistor Q2. A gate driver and level shifting circuit U1 (for example, PM8834) receives the gate control signal from the true output of the flip flop, buffers and level shifts that gate control signal, and applies the level shifted gate control signal to the gate of the transistor Q2. This turns on transistor Q2. Thus, transistor Q2 turns on substantially coincident with each zero-crossing detection made by comparator U3. With transistor Q2 turned on, the rectifier circuit outputs are short-circuited for a period of time beginning at the detected zero-crossing and delimited by the duty cycle of a PWM control signal applied to the gate of transistor Q2. Current from the ballast circuit 12 is accordingly diverted from being delivered to the LED lamp 14 while transistor Q2 is on. The diode D8' prevents discharge of the filter capacitor C4, which can then supply current to the LED lamp 14 for the duration of the PWM on-time when the ballast circuit 12 current source has been shorted by transistor Q2.

In the meantime, the complement output Q(bar) of the flip flop U2B transitions to logic low. This causes transistor Q3 to turn off. With transistor Q3 turned off, the resistor R8 supplies a current to charge capacitor C9 producing an increasing (ramping) voltage that is applied to the negative input of a comparator U6 as a RAMP signal. The positive input of the comparator U6 receives an ERROR signal that is derived from the sensed current $I_{LED}$ passing through the LED lamp 14. This will be described in greater detail below. When the increased voltage at the negative input of the comparator U6 exceeds the voltage of the error signal at the positive input of the comparator U6, the output logic state of the comparator U6 flips.

The output of the comparator U6 is connected to the clear input of the flip flop U2B. When the logic output state of the comparator U6 flips, the change in state at the clear input of the flip flop U2B causes the flip flop to be reset. The true output Q of the flip flop transitions to logic low and the transistor Q2 turns off (until the next detected zero-crossing event). With transistor Q2 turned off, rectified current output from the ballast circuit 12 is passed by diode D8' to charge capacitor C4 and be delivered to the LEDs 14.

The complement output Q(bar) of the flip flop simultaneously transitions to logic high, and the transistor Q3 turns on. This shorts across the capacitor C9 and causes the capacitor C9 to discharge. The voltage applied to the negative input of the comparator U6 by the RAMP signal accordingly decreases. When the ramp voltage at the negative input of the comparator U6 falls below the voltage of the ERROR signal at the positive input of the comparator U6, the output logic state of the comparator U6 flips back so that the clear input of the flip flop U2B is not asserted. This permits the setting of the flip flop U2B in response to the clock input at the next detected zero-crossing event.

The result of the foregoing circuit operations is to generate, for the control signal applied to the gate of the transistor Q2, a pulse width modulated signal having a duty cycle that is a function of the error signal (which is a function of a comparison of the sensed current $I_{LED}$ passing through the LED lamp 14 to a threshold). In other words, the control circuit 20 generates a pulse, synchronized to the AC zero-crossing, having a feedback circuit controlled pulse width.

The ERROR signal applied to the positive input of the comparator U6 is generated by a non-inverting integrator with addition circuit. That circuit includes an operational amplifier U4A having a negative input coupled to its output through an integrating capacitor C11. The resistor R5 forms the sense resistor $R_{sense}$, and a sensed voltage is developed across resistor R5 as a function of the current flowing in the LED lamp 14 as provided by capacitor C4 (i.e., when the transistor Q2 is turned on and the rectifier ballast circuit 12 output is shorted). A filter formed by resistor R6 and capacitor C8 functions to remove AC components from the sensed voltage (corresponding to the current $I_{LED}$ passing through the LED lamp 14). The filtered sensed voltage is applied to the positive input of the operational amplifier U4A. The integrating functionality serves to remove other transients from the sensed current signal.

The circuit U5 is a programmable shunt regulator circuit which sets a reference threshold for the current $I_{LED}$ sensing operation. A voltage divider is formed by resistors R10 and R11, with the tap node of the voltage divider connected to the negative input of the operational amplifier U4A. The programmable shunt regulator circuit is coupled in series with resistor R9 between the positive and negative supply voltage nodes and is further coupled to the voltage divider. The voltage divider develops a reference voltage that is derived from the circuit U5.

The operational amplifier U4A functions as an error amplifier in negative feedback that receives the reference voltage and the filtered sensed voltage and the reference voltage. The feedback circuit functions in a manner to drive the filtered sensed voltage to equal the reference voltage.

If the sensed current $I_{LED}$ passing through the LED lamp 14 (represented by the signal at the positive input of the operational amplifier U4A) is too high relative to the threshold value (set by the programmable shunt regulator circuit at the negative input of the operational amplifier U4A), the error voltage at the output of the operational amplifier U4A rises and delays the flipping of the comparator U6 output (and resetting of the flip flop U2B) because it will take longer for the rising ramp voltage to exceed the error signal voltage. Thus, the transistor Q2 will stay on for a longer period of time and stay off for a shorter period of time (i.e., the duty cycle D increases).

Conversely, if the sensed current $I_{LED}$ passing through the LED lamp 14 (represented by the signal at the positive input of the operational amplifier U4A) is too low relative to the threshold value (set by the programmable shunt regulator circuit at the negative input of the operational amplifier U4A), the error voltage at the output of the operational amplifier U4A decreases and accelerates the flipping of the comparator U6 output (and resetting of the flip flop U2B) because it will take less time for the rising ramp voltage to exceed the error signal voltage. Thus, the transistor Q2 will stay on for a shorter period of time and stay off for a longer period of time (i.e., the duty cycle D decreases).

The error amplifier U4A is a non-inverting amplifier having a breakpoint frequency set by the resistors R10 and R11 and the capacitor C11. Matching this breakpoint frequency to the corner frequency of the filter formed by resistor R6 and capacitor C8 gives a single pole response to the error amplifier.

The implementation of FIGS. 3A and 3B represents an exemplary circuit implementation for the control circuit 20. It will be understood that other types of pulse width modulation (PWM) control circuits having duty cycles synchronous to AC zero-crossing and responsive to sensed current $I_{LED}$ passing through the LED lamp 14 could be used.

It will further be understood that the analog control circuit 20 shown in FIGS. 3A and 3B could be alternatively implemented using a digital control circuit such as microcontroller.

It will further be understood that the control circuit could be configured to cause transistor Q2 to turn off at the zero-crossing and then turn on at some point in the half cycle determined by the output current.

The foregoing description has provided by way of exemplary and non-limiting examples a full and informative description of one or more exemplary embodiments of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. An apparatus, comprising:
    a rectifier circuit having input terminals coupled to receive an AC signal and output terminals configured to generate a DC signal;
    a diode coupled between one output terminal of the rectifier circuit and a first converter output terminal;
    a capacitor coupled between the first converter output terminal and a second converter output terminal;
    a switched shunt circuit coupled between output terminals of the rectifier circuit; and
    a control circuit configured to control actuation of the switched shunt circuit using a PWM control signal having a duty cycle set dependent on a comparison of a current error signal to a ramp signal,
    wherein the current error signal is generated by a circuit which integrates a difference between a sensed current flowing at the first and second converter output terminals and a threshold.

2. The apparatus of claim 1, further comprising a transformer configured to generate the AC signal from an AC input.

3. The apparatus of claim 1, wherein the switched shunt circuit comprises a MOSFET.

4. The apparatus of claim 1, wherein the control circuit comprises:
    a zero-crossing detection circuit coupled to sense the AC signal; and
    a current sensing circuit coupled to one of the first and second converter output terminals;
    wherein the control circuit is configured to switch the switched shunt circuit to a first state responsive to the detected zero-crossing of the AC signal and switch the switched shunt circuit to a second state responsive to the comparison.

5. The apparatus of claim 4, wherein the first state is closed and the second state is open.

6. The apparatus of claim 4, wherein the PWM control signal duty cycle is increased if the sensed current exceeds the threshold.

7. The apparatus of claim 4, wherein the PWM control signal duty cycle is decreased if the sensed current is less than the threshold.

8. The apparatus of claim 1, further comprising an LED load circuit coupled between the first and second converter output terminals.

9. The apparatus of claim 8, further comprising a housing configured to contain the rectifier circuit, diode, capacitor, switched shunt circuit, control circuit and LED load circuit.

10. The apparatus of claim 9, wherein the housing is a lamp bulb.

11. The apparatus of claim 9, wherein the housing is a lamp fixture, further comprising a fluorescent lighting ballast circuit having AC outputs coupled to the input terminals of the rectifier circuit.

12. The apparatus of claim 1, wherein the control circuit comprises:
    a first circuit configured to sense current flowing at one of the first and second converter output terminals;
    a second circuit configured to generate the ramp signal in response to said detected zero-crossing; and a third circuit configured to set the PWM control signal duty cycle responsive to a comparison of the ramp signal to the current error signal.

13. The apparatus of claim 1, wherein the control circuit comprises an analog control circuit configured to generate the PWM control signal for application to control actuation of the switched shunt circuit.

14. An apparatus, comprising:
a housing;
a plurality of LEDs located within the housing; and
an AC/DC power converter located within the housing and configured to supply current to the plurality of LEDs;
wherein the AC/DC power converter comprises:
   a rectifier circuit having input terminals coupled to receive an AC signal and output terminals configured to generate a DC signal;
   a diode coupled between one output terminal of the rectifier circuit and a first converter output terminal coupled to the plurality of LEDs;
   a capacitor coupled between the first converter output terminal and a second converter output terminal;
   a switched shunt circuit coupled between output terminals of the rectifier circuit; and
   a control circuit configured to control actuation of the switched shunt circuit using a PWM control signal having a duty cycle set dependent on a comparison of a current error signal to a ramp signal,
   wherein the current error signal is generated by a circuit which integrates a difference between a sensed current flowing at the first and second converter output terminals through the plurality of LEDs and a threshold.

15. The apparatus of claim 14, wherein the AC/DC power converter further comprises a transformer configured to generate the AC signal from an AC input.

16. The apparatus of claim 14, wherein the housing is a lamp bulb.

17. The apparatus of claim 14, wherein the housing is a lamp fixture, further comprising a fluorescent lighting ballast circuit having AC outputs coupled to inputs of the rectifier circuit.

18. The apparatus of claim 1, further comprising a filter configured to filter the sensed current before integration and wherein the circuit which integrates comprises an amplifier and wherein a corner frequency of the filter matches a breakpoint frequency of the amplifier.

19. The apparatus of claim 1, wherein the switched shunt circuit comprises a transistor switch directly connected between the output terminals of the rectifier circuit.

20. An apparatus, comprising:
a rectifier circuit having input terminals coupled to receive an AC signal and output terminals configured to generate a DC signal;
a diode coupled between one output terminal of the rectifier circuit and a first converter output terminal;
a capacitor coupled between the first converter output terminal and a second converter output terminal;
a switched shunt circuit coupled between output terminals of the rectifier circuit; and
a control circuit comprising:
   a first circuit configured to sense current flowing at one of the first and second converter output terminals, integrate the sensed current and generate a current error signal as a difference between the integrated sensed current and a threshold;
   a second circuit configured to generate a ramp signal in response to said detected zero-crossing; and
   a third circuit configured to set a duty cycle of a PWM control signal configured to control actuation of the switched shunt circuit responsive to a comparison of the ramp signal to the current error signal.

21. The apparatus of claim 20, further comprising a transformer configured to generate the AC signal from an AC input.

22. The apparatus of claim 20, wherein the control circuit comprises:
a zero-crossing detection circuit coupled to sense the AC signal; and
a current sensing circuit coupled to one of the first and second converter output terminals;
wherein the control circuit is configured to switch the switched shunt circuit to a first state responsive to the detected zero-crossing of the AC signal and switch the switched shunt circuit to a second state responsive to the comparison.

23. The apparatus of claim 22, wherein the first state is closed and the second state is open.

24. The apparatus of claim 22, wherein the PWM control signal duty cycle is increased if the sensed current exceeds the threshold and wherein the PWM control signal duty cycle is decreased if the sensed current is less than the threshold.

25. The apparatus of claim 20, further comprising an LED load circuit coupled between the first and second converter output terminals.

* * * * *